United States Patent
Liu et al.

(10) Patent No.: US 12,446,472 B2
(45) Date of Patent: *Oct. 14, 2025

(54) VIBRATION PANEL, MANUFACTURING METHOD AND DRIVING METHOD THEREFOR AND VIBRATION APPARATUS

(71) Applicants: Beijing BOE Technology Development Co., Ltd., Beijing (CN); BOE Technology Group Co., Ltd., Beijing (CN)

(72) Inventors: Xiaotong Liu, Beijing (CN); Yuju Chen, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 54 days.

This patent is subject to a terminal disclaimer.

(21) Appl. No.: 17/757,805

(22) PCT Filed: Aug. 27, 2021

(86) PCT No.: PCT/CN2021/115047
§ 371 (c)(1),
(2) Date: Jun. 21, 2022

(87) PCT Pub. No.: WO2023/024081
PCT Pub. Date: Mar. 2, 2023

(65) Prior Publication Data
US 2024/0215456 A1 Jun. 27, 2024

(51) Int. Cl.
*H10N 39/00* (2023.01)
*G06F 3/0354* (2013.01)
(Continued)

(52) U.S. Cl.
CPC ......... *H10N 39/00* (2023.02); *G06F 3/03547* (2013.01); *G06F 3/041* (2013.01); *G06F 3/0446* (2019.05)

(58) Field of Classification Search
CPC ...... G06F 3/016; G06F 3/0412; G06F 3/0414; G06F 3/044; G06F 3/045; G06F 1/1652;
(Continued)

(56) References Cited

U.S. PATENT DOCUMENTS 5,583,390 A * 12/1996 Seki .................. H02N 2/08
310/323.07
10,013,058 B2 * 7/2018 Puskarich ............ H10N 30/206
(Continued)

FOREIGN PATENT DOCUMENTS

CN 101751817 A 6/2010
CN 101901048 A * 12/2010 ............ G06F 3/0488
(Continued)

OTHER PUBLICATIONS

Chen, et al., Design and application of vibration emoticons in wearable computing devices, Modern Industrial Design Institute, Zhejiang University, Hangzhou, China, Dec. 2015.
(Continued)

*Primary Examiner* — Dominick L Plakkoottam
(74) *Attorney, Agent, or Firm* — Workman Nydegger

(57) ABSTRACT

Disclosed are a vibration panel, a manufacturing method and driving method therefor and a vibration apparatus. The vibration panel includes: a base substrate having at least one vibration element, where at least one annular hollow pattern is provided at a portion, corresponding to each vibration element, of the base substrate, an orthographic projection of the annular hollow pattern corresponding to each vibration element on the base substrate is non-closed, and the annular hollow pattern corresponding to each vibration element has a different total area; and at least one driver positioned on one side of the base substrate, each driver being configured to drive at least one vibration element to independently vibrate.

20 Claims, 21 Drawing Sheets

(51) Int. Cl.
  *G06F 3/041* (2006.01)
  *G06F 3/044* (2006.01)

(58) Field of Classification Search
  CPC ......... G06F 2203/04112; G06F 3/0202; G06F 3/03547; G06F 3/04166; G06F 3/0445; G06F 3/0446; G06F 3/0488; G06F 3/041; H10N 30/092; H10N 30/20; H10N 30/206; H10N 30/852; H10N 30/853; H10N 30/857; H10N 30/87; H10N 39/00
  See application file for complete search history.

(56) References Cited

U.S. PATENT DOCUMENTS

| | | | |
|---|---|---|---|
| 2011/0279374 A1* | 11/2011 | Park | G06F 3/041 345/168 |
| 2011/0291976 A1* | 12/2011 | Takada | G06F 3/041 345/173 |
| 2016/0277843 A1* | 9/2016 | Babayoff | H04R 3/00 |
| 2017/0192508 A1* | 7/2017 | Lim | G06F 3/0412 |
| 2018/0164888 A1 | 6/2018 | Ham et al. | |
| 2018/0300998 A1 | 10/2018 | Israr et al. | |
| 2020/0059733 A1* | 2/2020 | Shin | H04R 17/00 |
| 2021/0026480 A1 | 1/2021 | Jung et al. | |
| 2022/0097099 A1 | 3/2022 | Liu | |

FOREIGN PATENT DOCUMENTS

| | | | | |
|---|---|---|---|---|
| CN | 202736016 U | | 2/2013 | |
| CN | 203084681 U | | 7/2013 | |
| CN | 104714625 A | | 6/2015 | |
| CN | 105808112 A | | 7/2016 | |
| CN | 108200237 A | | 6/2018 | |
| CN | 108227913 A | | 6/2018 | |
| CN | 110650414 A | | 1/2020 | |
| CN | 111158468 A | | 5/2020 | |
| CN | 111430412 A | | 7/2020 | |
| CN | 111583821 A | | 8/2020 | |
| CN | 112138972 A | | 12/2020 | |
| JP | 2015207242 A | | 11/2015 | |
| JP | 2016129015 A | * | 7/2016 | |
| KR | 20110029812 A | * | 3/2011 | ............ H04R 17/00 |
| KR | 20150049203 A | * | 5/2015 | ............ G06F 3/016 |
| WO | WO-2019235301 A1 | * | 12/2019 | ............ H01H 13/00 |

OTHER PUBLICATIONS

Babu, et al., Hello Haptic World: A Haptics Educational Kit for Interacting with Robots, International Symposium on System Integration, Meijo University, Nagoya, Japan, Dec. 2015.

* cited by examiner

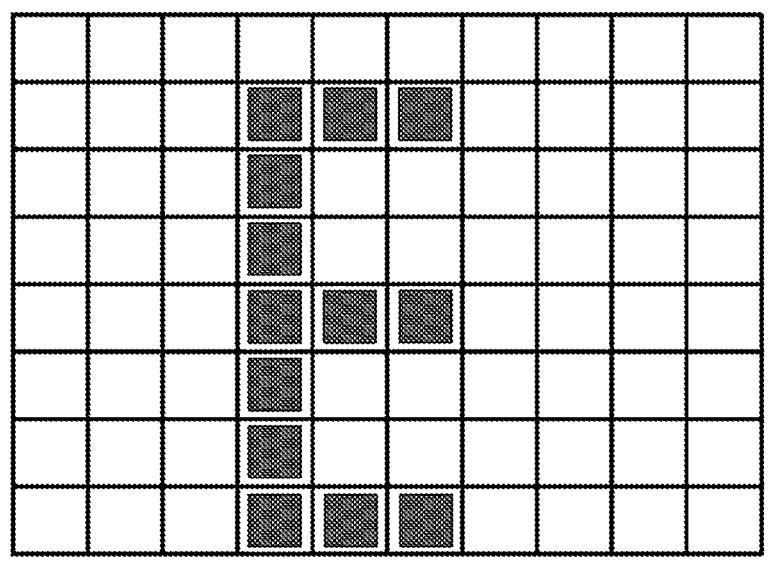
 Vibration element
 Non-vibration element
Fig. 14

Providing a base substrate, where the base substrate has at least one vibration element, at least one annular hollow pattern is provided at a portion, corresponding to each vibration element, of the base substrate, an orthographic projection of an annular hollow pattern corresponding to each vibration element on the base substrate is non-closed, and the annular hollow pattern corresponding to each vibration element has a different total area ―S1601

Manufacturing at least one driver on one side of the base substrate, where the driver is configured to drive at least one vibration element to independently vibrate ―S1602

VIBRATION PANEL, MANUFACTURING METHOD AND DRIVING METHOD THEREFOR AND VIBRATION APPARATUS

CROSS REFERENCE TO RELATED APPLICATIONS

The present disclosure is a US National Stage of International Application No. PCT/CN2021/115047, filed on Aug. 27, 2021, the entire contents of which are incorporated herein by reference.

FIELD

The present disclosure relates to the field of sensors, in particular to a vibration panel, a manufacturing method and driving method therefor and a vibration apparatus.

BACKGROUND

Haptics enables interaction between a user and a terminal through the sense of touch, thereby becoming a focus of scientific and technological development at present. Further, Haptics can be divided into two categories, one is tactile representation, and the other one is vibration feedback.

SUMMARY

Embodiments of the present disclosure provide a vibration panel, a manufacturing method and driving method therefor and a vibration apparatus. The specific solutions are as follows.

An embodiment of the present disclosure provides a vibration panel. The vibration panel includes a base substrate including at least one vibration element, where at least one annular hollow pattern is provided at a portion, corresponding to each of the at least one vibration element, of the base substrate, an orthographic projection of an annular hollow pattern corresponding to the each vibration element on the base substrate is non-closed, and the annular hollow pattern corresponding to the each vibration element has a different total area; and at least one driver arranged on one side of the base substrate, where the at least one driver is configured to drive the at least one vibration element to independently vibrate.

In a possible implementation, the above vibration panel provided in the embodiment of the present disclosure further includes a reinforcement structure arranged on one side of the base substrate, wherein the reinforcement structure is arranged in an innermost region of the annular hollow pattern.

In a possible implementation, in the above vibration panel provided in the embodiment of the present disclosure, the reinforcement structure includes a counterweight layer, where the counterweight layer and the at least one driver are arranged on a same side of the base substrate.

In a possible implementation, in the above vibration panel provided in the embodiment of the present disclosure, the counterweight layer is made of at least one of the following materials: molybdenum (Mo), cuprum (Cu) and aluminum (Al).

In a possible implementation, in the above vibration panel provided in the embodiment of the present disclosure, a shape of the counterweight layer is an axisymmetric figure or a centrosymmetric figure, and a center of the counterweight layer coincides with a center of the vibration element.

In a possible implementation, in the above vibration panel provided in the embodiment of the present disclosure, the shape of the counterweight layer includes at least one of a square; a circle; an annulus; a polygon; and an annular structure, where the annular structure includes a plurality of sub-structures arranged at intervals, and the plurality of sub-structures are uniformly arranged around a center of a corresponding vibration element at intervals.

In a possible implementation, in the above vibration panel provided in the embodiment of the present disclosure, the reinforcement structure includes a raised layer, where the raised layer and the at least one driver are arranged on opposite sides of the base substrate.

In a possible implementation, in the above vibration panel provided in the embodiment of the present disclosure, the raised layer is made of at least one of the following materials: polydimethylsiloxane, polyethylene terephthalate and polycarbonate.

In a possible implementation, in the above vibration panel provided in the embodiment of the present disclosure, the raised layer is in a shape of an axisymmetric figure or a centrosymmetric figure, and a center of the raised layer coincides with a center of a corresponding vibration element.

In a possible implementation, in the above vibration panel provided in the embodiment of the present disclosure, the raised layer is of an integrated structure; or, the raised layer includes a first raised portion arranged in the center of the corresponding vibration element and at least one second annular raised portion arranged around the first raised portion, and an orthographic projection of the second annular raised portion on the base substrate is closed or non-closed; or, the raised layer includes at least one second annular raised portion that is arranged around the center of the corresponding vibration element, and an orthographic projection of the second annular raised portion on the base substrate is closed or non-closed.

In a possible implementation, in the above vibration panel provided in the embodiment of the present disclosure, the non-closed second annular raised portion includes an even number of second raised sub-portions, and any two second raised sub-portions at opposite positions are symmetrically arranged with the center of the corresponding vibration element as a center of symmetry.

In a possible implementation, in the above vibration panel provided in the embodiment of the present disclosure, a shape of the annular hollow pattern includes a centrosymmetric figure, and a center of symmetry of the centrosymmetric figure coincides with the center of a corresponding vibration element.

In a possible implementation, in the above vibration panel provided in the embodiment of the present disclosure, the annular hollow pattern includes a plurality of sub-portions, and the plurality of sub-portions are uniformly arranged around a center of a corresponding vibration element at intervals, and each of the plurality of sub-portions is in a shape of any one of: an arc and a polygonal box.

In a possible implementation, in the above vibration panel provided in the embodiment of the present disclosure, an even number of sub-portions are arranged, and two sub-portions at opposite positions are symmetrically arranged with the center of the corresponding vibration element as a center of symmetry.

In a possible implementation, in the above vibration panel provided in the embodiment of the present disclosure, for the each vibration element corresponding to the annular hollow pattern having a different total area, the annular hollow pattern in the each vibration element is identical in number and different in size; or, for the each vibration element corresponding to the annular hollow pattern having a different total area, the annular hollow pattern in the each vibration element is different in number and identical in size.

In a possible implementation, in the above vibration panel provided in the embodiment of the present disclosure, each of the at least one driver drives four vibration elements to independently vibrate, the hollow pattern corresponding to each of the four vibration elements has a different total area, and the each driver is arranged in a middle of the four vibration elements.

In a possible implementation, in the above vibration panel provided in the embodiment of the present disclosure, the each driver is a piezoelectric device, and the piezoelectric device includes a first electrode, a piezoelectric layer and a second electrode that are stacked on the base substrate; first electrodes corresponding to piezoelectric devices in a same row are a same electrode, and the first electrodes extend in a first direction; second electrodes corresponding to piezoelectric devices in a same column are a same electrode, and the second electrodes extend in a second direction; and the first direction and the second direction intersect with each other.

In a possible implementation, in the above vibration panel provided in the embodiment of the present disclosure, the driver is a piezoelectric device, and the piezoelectric device includes a first electrode, a piezoelectric layer and a second electrode that are stacked on the base substrate; the vibration panel further includes a plurality of scanning lines and a plurality of voltage input lines that intersect with each other, the plurality of scanning lines and the plurality of voltage input lines define a plurality of vibration regions, and each of the plurality of vibration region includes four vibration elements; and the each vibration region includes a switching transistor, gate electrodes of switching transistors corresponding to piezoelectric devices in a same row are electrically connected to a same scanning line, first electrodes of the switching transistors corresponding to the piezoelectric devices in a same column are electrically connected to a same voltage input line, second electrodes of the switching transistors are electrically connected to first electrodes of the corresponding piezoelectric devices, and second electrodes of the piezoelectric devices are electrically connected to fixed potential terminals.

In a possible implementation, in the above vibration panel provided in the embodiment of the present disclosure, the each vibration region further includes a capacitor, a first terminal of the capacitor is connected between a second electrode of a corresponding switching transistor and a first electrode of a corresponding piezoelectric device, and a second terminal of the capacitor is connected between a second electrode of the corresponding piezoelectric device and a fixed potential terminal.

Correspondingly, an embodiment of the present disclosure further provides a vibration apparatus. The vibration apparatus includes any one of the above vibration panels.

Correspondingly, an embodiment of the present disclosure further provides a method for manufacturing a vibration panel. The manufacturing method includes: providing a base substrate, where the base substrate includes at least one vibration element, at least one annular hollow pattern is provided at a portion, corresponding to each of the at least one vibration element, of the base substrate, an orthographic projection of an annular hollow pattern corresponding to the each vibration element on the base substrate is non-closed, and the annular hollow pattern corresponding to the each vibration element has a different total area; and manufacturing at least one driver on one side of the base substrate, where the at least one driver is configured to drive the at least one vibration element to independently vibrate.

In a possible implementation, the above manufacturing method provided in the embodiment of the present disclosure further includes: manufacturing a reinforcement structure on one side of the base substrate, where the reinforcement structure is arranged at an innermost region of the annular hollow pattern.

In a possible implementation, in the above manufacturing method provided in the embodiment of the present disclosure, the reinforcement structure includes a counterweight layer, where the counterweight layer is manufactured on one side of the base substrate by means of evaporation or adhesion, the counterweight layer and the at least one driver are arranged on a same side of the base substrate, and the counterweight layer is arranged in an innermost region in the annular hollow pattern.

In a possible implementation, in the above manufacturing method provided in the embodiment of the present disclosure, the reinforcement structure includes a raised layer, the raised layer is manufactured on one side of the base substrate by means of coating or attachment, the raised layer and the at least one driver are arranged on opposite sides of the base substrate, and the raised layer is arranged in the innermost region in the annular hollow pattern.

Correspondingly, an embodiment of the present disclosure further provides a driving method for driving any one of the above vibration panels. The driving method includes: adjusting a frequency of an alternating voltage for driving a driver to enable the each vibration element to independently vibrate; and adjusting and controlling a vibration amplitude of the driver in a target region by adjusting the alternating voltage for driving the driver.

In a possible implementation, in the above driving method provided in the embodiment of the present disclosure, the method further includes applying alternating voltages to a first electrode and a second electrode, where piezoelectric layers in overlapping regions of the first electrode and the second electrode vibrate to drive a corresponding vibration element at a target position to vibrate.

In a possible implementation, in the above driving method provided in the embodiment of the present disclosure, the method further includes applying scanning signals to scanning lines row-by-row, and inputting an alternating voltage to a voltage input line corresponding to a piezoelectric device at a target position, to enable the piezoelectric layer at the target position to vibrate to drive the vibration element at the target position to vibrate.

BRIEF DESCRIPTION OF THE DRAWINGS

FIG. 14 is a schematic diagram of local vibration corresponding to FIG. 10.

FIG. 16 is a flowchart of a method for manufacturing a vibration panel provided in an embodiment of the present disclosure.

DETAILED DESCRIPTION OF THE EMBODIMENTS

Figure 1:
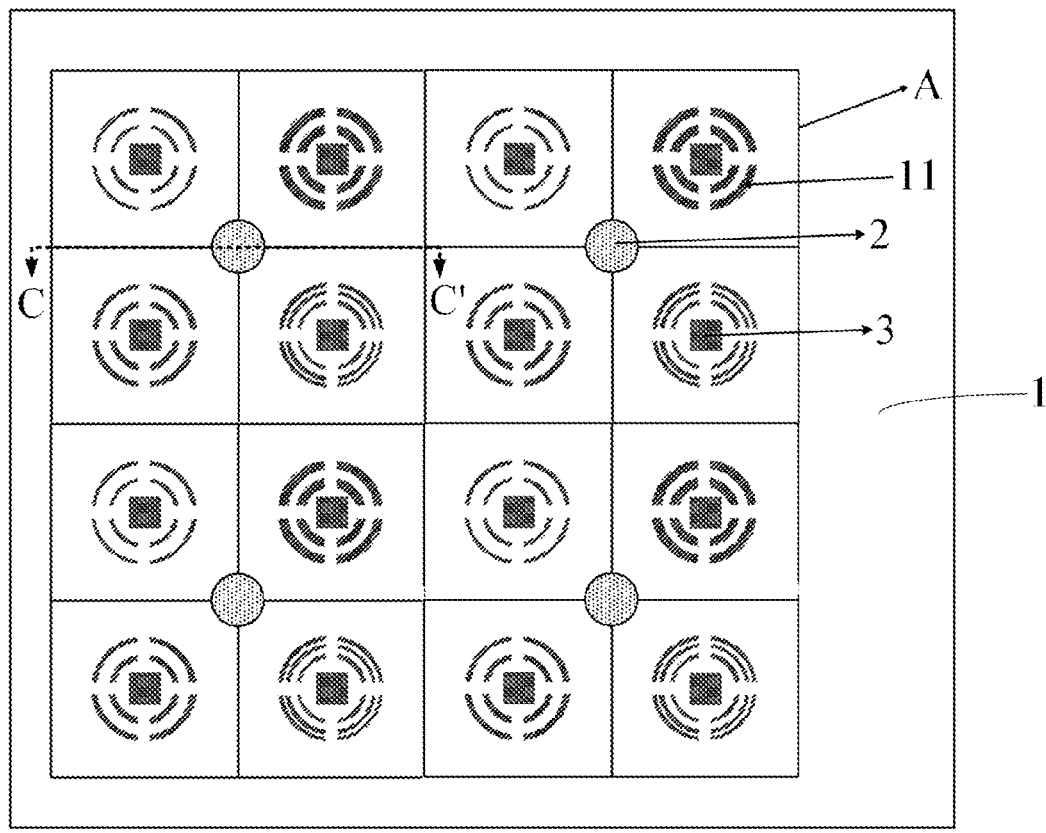
FIG. 1 is a top view of a vibration panel provided in an embodiment of the present disclosure.

In order to make the objectives, technical solutions and advantages of embodiments of the present disclosure more obvious, the technical solutions of the present disclosure will be clearly and completely described below in combination with the accompanying drawings in the embodiments of the present disclosure. Apparently, the described embodiments are merely some rather than all of the embodiments of the present disclosure. The embodiments of the present disclosure and the features in the embodiments may be combined with each other without conflict. On the basis of the described embodiments of the present disclosure, all other embodiments obtained by those skilled in the art without making creative efforts fall within the scope of protection of the present disclosure.

Unless otherwise defined, technical terms or scientific terms used in the present disclosure should have the ordinary meanings understood by those of ordinary skill in the art to which the present disclosure belongs. "Comprise", "include" or other similar words used in the present disclosure mean that an element or object appearing before the word contains elements or objects listed after the word and equivalents thereof, without excluding other elements or objects. "Connection", "connected" or other similar words are not limited to physical or mechanical connections, but may include electrical connections, whether direct or indirect. The terms "inner", "outer", "upper", "lower", etc. are merely used to indicate relative position relations, and when the absolute position of a described object changes, the relative position may change accordingly.

It should be noted that sizes and shapes of all patterns in the accompanying drawings do not reflect true scale and are merely intended to illustrate the contents of the present disclosure. Moreover, from beginning to end, identical or similar reference numerals denote identical or similar elements or elements having identical or similar functions.

Figure 2:
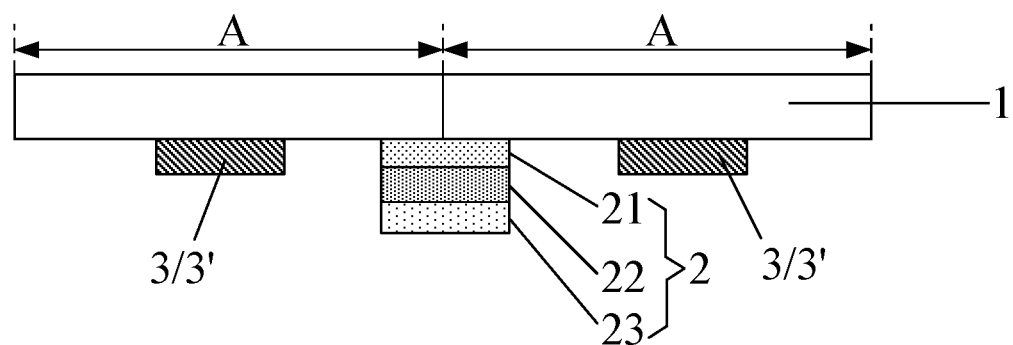
FIG. 2 is a sectional view in a CC' direction in FIG. 1.

An embodiment of the present disclosure provides a vibration panel. As shown in FIG. 1 and FIG. 2, FIG. 1 illustrates a top view of a vibration panel, and FIG. 2 illustrates a sectional view in a CC' direction in FIG. 1. The vibration panel includes a base substrate 1 and at least one driver 2.

The base substrate 1 includes at least one vibration element A, for example, as shown in FIG. 1, a base substrate 1 has a plurality of vibration elements A arranged in an array. At least one annular hollow pattern 11 is provided at a portion, corresponding to each vibration element A, of the base substrate 1. An orthographic projection of an annular hollow pattern 11 corresponding to each vibration element A on the base substrate is non-closed, and the annular hollow pattern 11 corresponding to each vibration element A has a different total area.

The at least one driver 2 is arranged on one side of the base substrate 1. Each driver 2 is configured to drive at least one vibration element A to independently vibrate.

It should be noted that in the case that each driver 2 being configured to drive at least one vibration element A to independently vibrate, it means that when the base substrate 1 has a plurality of vibration elements, one driver 2 may correspond to one or more vibration elements A, and a vibration frequency corresponding to each vibration element A is different. For example, one driver 2 corresponds to two vibration elements A, when an alternating current signal with a first frequency is applied to the driver 2, the driver 2 drives one vibration element A to independently vibrate; and when an alternating current signal with a second frequency is applied to the driver 2, the driver 2 drives the other vibration element A to independently vibrate, and so on.

According to the vibration panel provided in the embodiment of the present disclosure, by etching the non-closed annular hollow pattern 11 having a different total area in each vibration element A of the base substrate 1, since the annular hollow pattern 11 in each vibration element A has a different total area, a frequency of a signal required to be applied to the annular hollow pattern for vibration is also different. Therefore, by applying different frequency signals to different vibration elements, each vibration element A may independently vibrate, thereby controlling the base substrate 1 to generate local vibration. Compared with overall vibration of a base substrate in the related art, the local vibration realized in the present disclosure may reduce power consumption and resolve a heating problem of the vibration panel caused by vibration, thereby improving performance of the device.

During specific implementation, the base substrate may be made of glass, silicon, silicon dioxide ($SiO_2$), sapphire or metal wafer, which is not limited herein, and those skilled in the art may set the base substrate according to actual application requirements.

The panel generates local vibration by means of different driving frequencies, however, for some large surfaces, design difficulties will be increased only by adjusting the driving frequencies. Moreover, when a panel local vibration solution for realizing tactile representation is applied to a smart bracelet, the smart bracelet is likely to be attached to the back of a hand after working for a long time, thereby affecting a vibration effect. Therefore, the above vibration panel provided in the embodiment of the present disclosure further includes, as shown in FIGS. 1 and 2, one or more reinforcement structures 3 arranged on one side of the base substrate 1. The reinforcement structure 3 is positioned at an innermost region of the annular hollow pattern 11. According to the present disclosure, by arranging the reinforcement structure 3 in the innermost region of the annular hollow pattern 11, a sense of touch of local vibration may be enhanced, and user experience may be improved.

During specific implementation, in the above vibration panel provided in the embodiment of the present disclosure, as shown in FIG. 2, the reinforcement structure 3 includes a counterweight layer 3'. The counterweight layer 3' and the driver 2 are arranged on the same side of the base substrate 1. Specifically, by preparing one or more counterweight layers 3' (mass blocks) in the innermost regions of the hollow patterns 11 of the vibration elements A, mass of the vibration elements A may be increased, and an acting force of local vibration is increased on the basis of not increasing a resonance frequency of a system, thereby improving the sense of touch of local vibration. Furthermore, a sense of touch for local vibration is F=ma, where a represents an accelerated velocity of a vibration region, and m represents mass of a vibration system. According to a vibration theory, a resonance frequency of a system is $$f = \frac{1}{2\pi}\sqrt{\frac{k}{m}},$$

where k represents equivalent stiffness of the system, and m represents equivalent mass of the system. According to the present disclosure, m is only increased in a local region such that a resonance frequency may not be greatly improved, and thus it is ensured that a frequency range of a local vibration region may be within a skin sensitive range (0 Hz-1000 Hz).

During specific implementation, in the above vibration panel provided in the embodiment of the present disclosure, as shown in FIG. 2, the counterweight layer 3' is made of at least one of the following materials including but not limited to molybdenum (Mo), cuprum (Cu) and aluminum (Al). Specifically, a counterweight layer in a specific shape may be made of these materials, and is fixed in the innermost region of the hollow pattern 11 corresponding to the vibration element A shown in FIG. 1 by means of evaporation, adhesion and other ways, thereby enhancing the sense of touch and improving the user experience.

During specific implementation, in the above vibration panel provided in the embodiment of the present disclosure, as shown in FIGS. 1 and 2, the counterweight layer 3' may be in a shape of an axisymmetric figure or a centrosymmetric figure, and a center of the counterweight layer 3' coincides with a center of the vibration element. In this way, when the counterweight layer 3' in a shape of an axisymmetric figure or a centrosymmetric figure is fixed in the innermost region of the hollow pattern 11 corresponding to the vibration element A shown in FIG. 1, vibration at all positions of the vibration element A may be made uniform.

During specific implementation, in the above vibration panel provided in the embodiment of the present disclosure, as shown in FIGS. 1 and 2, the counterweight layer 3' is in a shape of a square, which is certainly not limited thereto. For example, a shape of the counterweight layer 3' may include at least one of the following shapes.

Figure 3A:
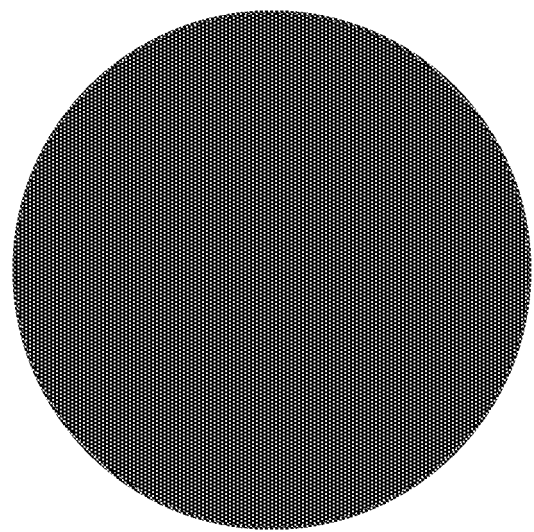
FIGS. 3A-3E are schematic diagrams of a counterweight layer provided in an embodiment of the present disclosure.

As shown in FIG. 3A, the counterweight layer 3' is in a shape of a circle.

Figure 3B:
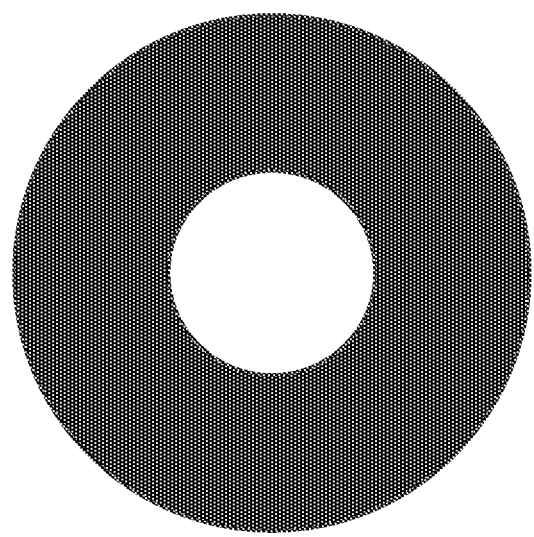

As shown in FIG. 3B, the counterweight layer 3' is in a shape of an annulus.

Figure 3C:
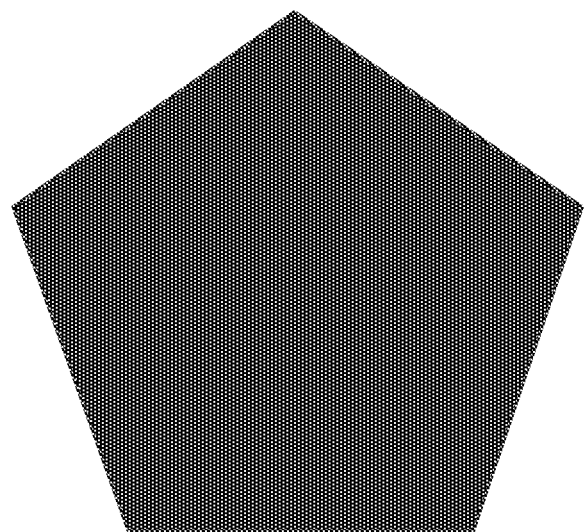
Figure 3D:
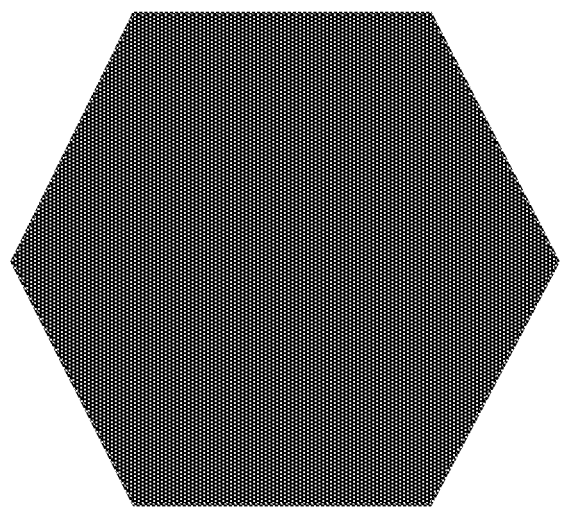

As shown in FIGS. 3C and 3D, the counterweight layer 3' is in a shape of a polygon, specifically, the counterweight layer 3' shown in FIG. 3C is in a shape of a pentagon, and the counterweight layer 3' shown in FIG. 3D is in a shape of a hexagon.

Figure 3E:
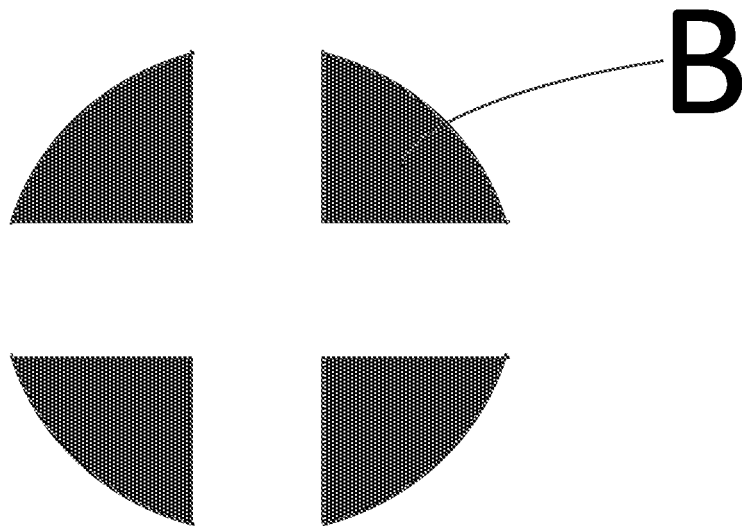

As shown in FIG. 3E, the counterweight layer 3' is in a shape of an annular structure, where the annular structure includes a plurality of sub-structures B arranged at intervals, and the plurality of sub-structures B are uniformly arranged at intervals around a center of the vibration element A in FIG. 1.

Figure 4:
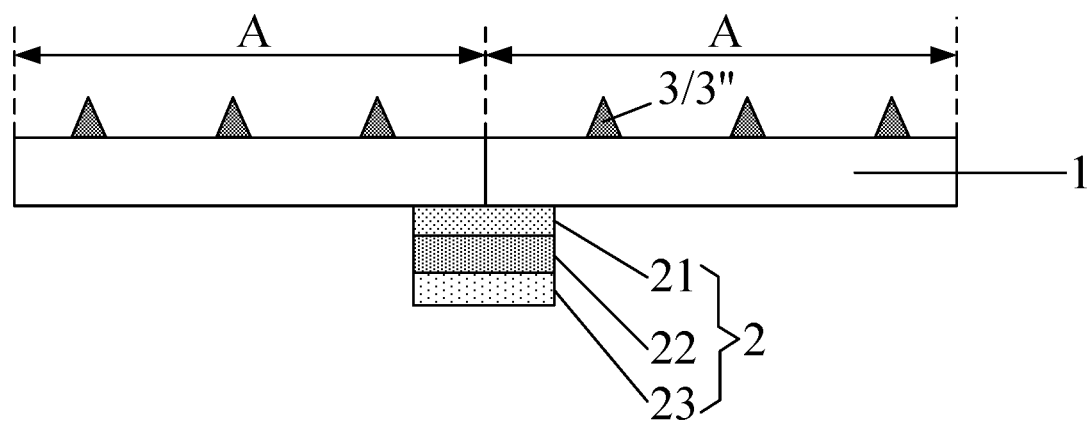
FIG. 4 is a structural schematic diagram of another vibration panel provided in an embodiment of the present disclosure.

During specific implementation, in the above vibration panel provided in the embodiment of the present disclosure, as shown in FIG. 4, the reinforcement structure 3 includes a raised layer 3', the raised layer 3' and the driver 2 are arranged on opposite sides of the base substrate 1, that is, the raised layer 3' and the counterweight layer 3' are correspondingly arranged on two sides of the base substrate 1. In the present disclosure, by adding the raised layer 3' in the innermost region of the hollow pattern 11 in the vibration element A, the sense of touch may be further enhanced. Moreover, when the vibration panel is applied in products such as a smart bracelet, a sense of touch weakening phenomenon caused by large-area attachment to the skin may be prevented by means of the raised layer 3", thereby further improving the sense of touch of local vibration, and further improving the user experience.

Figure 5:
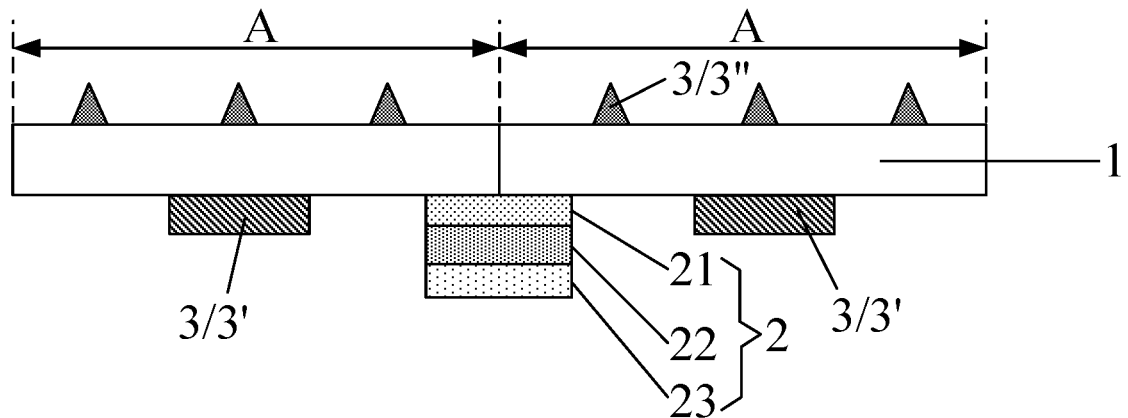
FIG. 5 is a structural schematic diagram of yet another vibration panel provided in an embodiment of the present disclosure.

During specific implementation, in the above vibration panel provided in the embodiment of the present disclosure, as shown in FIG. 5, the reinforcement structure 3 includes a counterweight layer 3' shown in FIG. 2 and a raised layer 3" shown in FIG. 4, the counterweight layer 3' and the driver 2 are arranged on the same side of the base substrate 1, and the raised layer 3" and the driver 2 are arranged on the opposite sides of the base substrate 1, that is, the raised layer 3" and the counterweight layer 3' are correspondingly arranged on two sides of the base substrate 1. In the present disclosure, by adding the counterweight layer 3' and the raised layer 3" in the innermost region of the hollow pattern 11 in the vibration element A, the sense of touch may be further enhanced, and the user experience may be further improved.

During specific implementation, in the above vibration panel provided in the embodiment of the present disclosure, as shown in FIGS. 4 and 5, the raised layer 3" is made of at least one of the following materials including but are not limited to polydimethylsiloxane (PDMS), polyethylene terephthalate (PET) and polycarbonate (PC). Specifically, some patterns having raised surfaces may be made of PDMS, PET, PC, etc., and are fixed in the innermost region of the hollow pattern 11 corresponding to the vibration element A shown in FIG. 1 (the patterns and the counterweight layer 3' being positioned on two sides of the base substrate 1 and correspondingly arranged) by means of coating or attachment, thereby enhancing the sense of touch and improving the user experience.

Figure 6A:
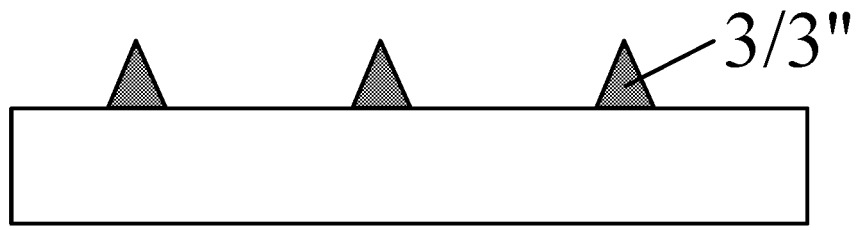
FIGS. 6A and 6B are sectional views of raised layers in FIGS. 4 and 5.
Figure 6B:
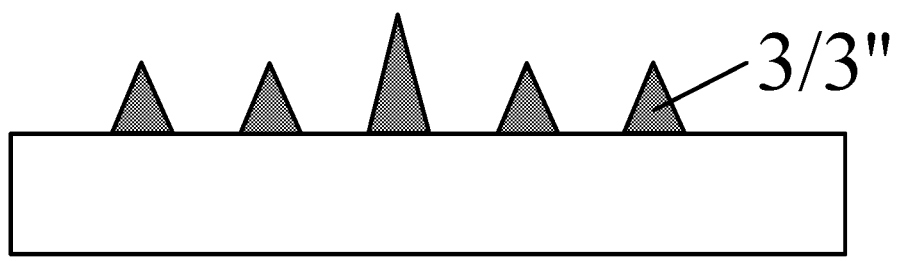

During specific implementation, as shown in FIGS. 6A and 6B, the raised layers 3' may have the same height or different heights. Specifically, as shown in FIG. 6A, the raised layers 3' have the same height; and as shown in FIG. 6B, the raised layers 3' have different heights. Further, each raised layer 3' has a height of 0 mm-5 mm.

During specific implementation, in the above vibration panel provided in the embodiment of the present disclosure, as shown in FIGS. 4 and 5, the raised layer 3" may be in a shape of an axisymmetric figure or a centrosymmetric figure, and the center of each raised layer 3" coincides with the center of the vibration element A. In this way, when the raised layer 3" in a shape of axisymmetric figure or a centrosymmetric figure is fixed in the innermost region of the hollow pattern 11 corresponding to the vibration element A shown in FIG. 1, vibration at all positions of the vibration element A may be made uniform.

Figure 7A:
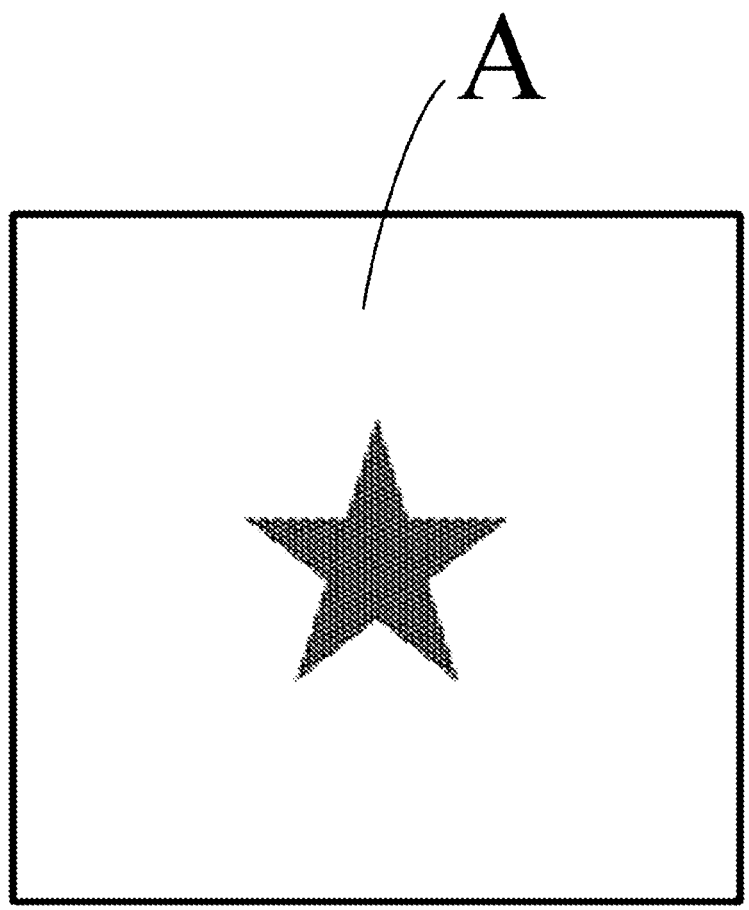
FIGS. 7A-7F are schematic diagrams of a raised layer provided in an embodiment of the present disclosure.

During specific implementation, in the above vibration panel provided in the embodiment of the present disclosure, the raised layer 3″ may be of an integrated structure, for example, as shown in FIG. 7A, the raised layer 3″ is in a shape of a pentagon, which is certainly not limited thereto.

Figure 7B:
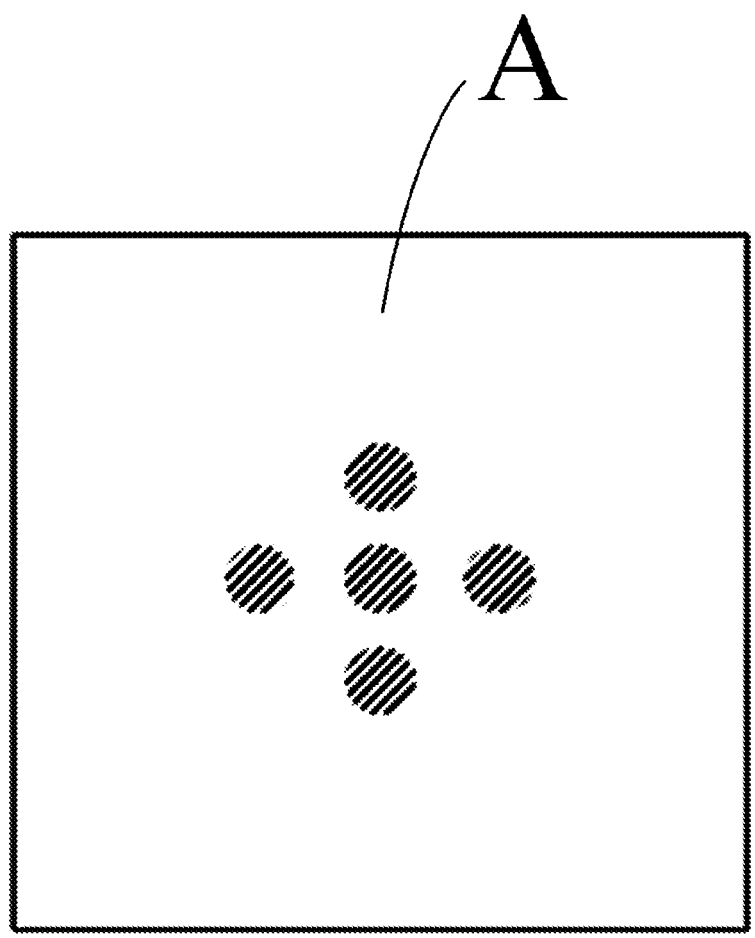
Figure 7C:
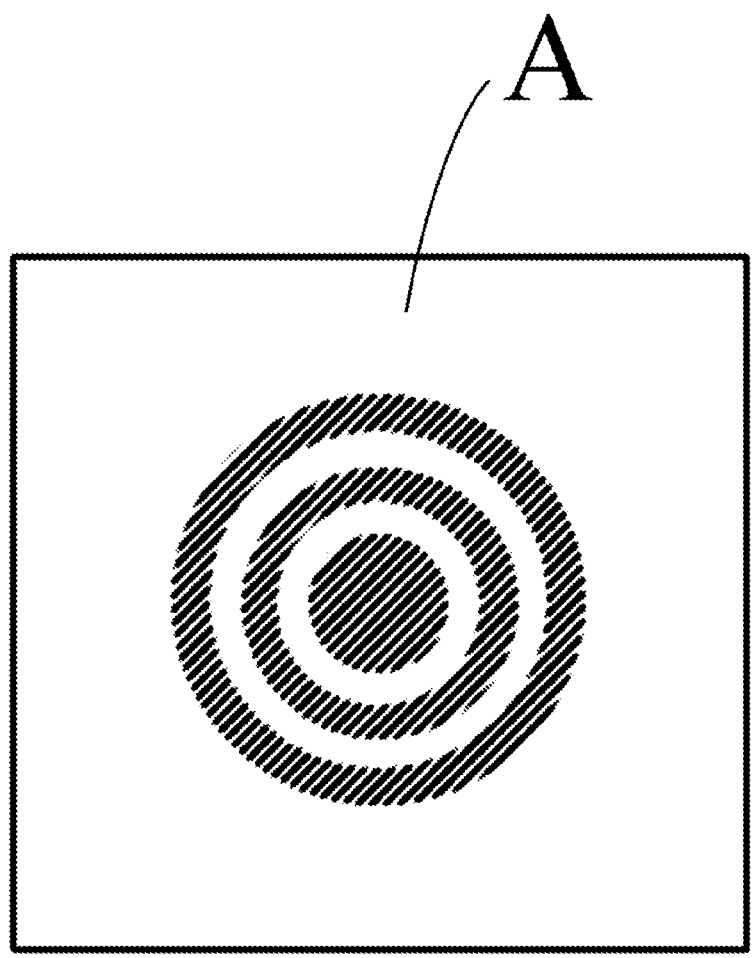

Alternatively the raised layer 3″ includes a first raised portion D arranged in the center of the vibration element A and at least one second annular raised portion E arranged around the first raised portion D, and an orthographic projection of the second annular raised portion E on the base substrate is closed or non-closed, such as structures shown in FIGS. 7B and 7C, which is certainly not limited thereto.

Figure 7D:
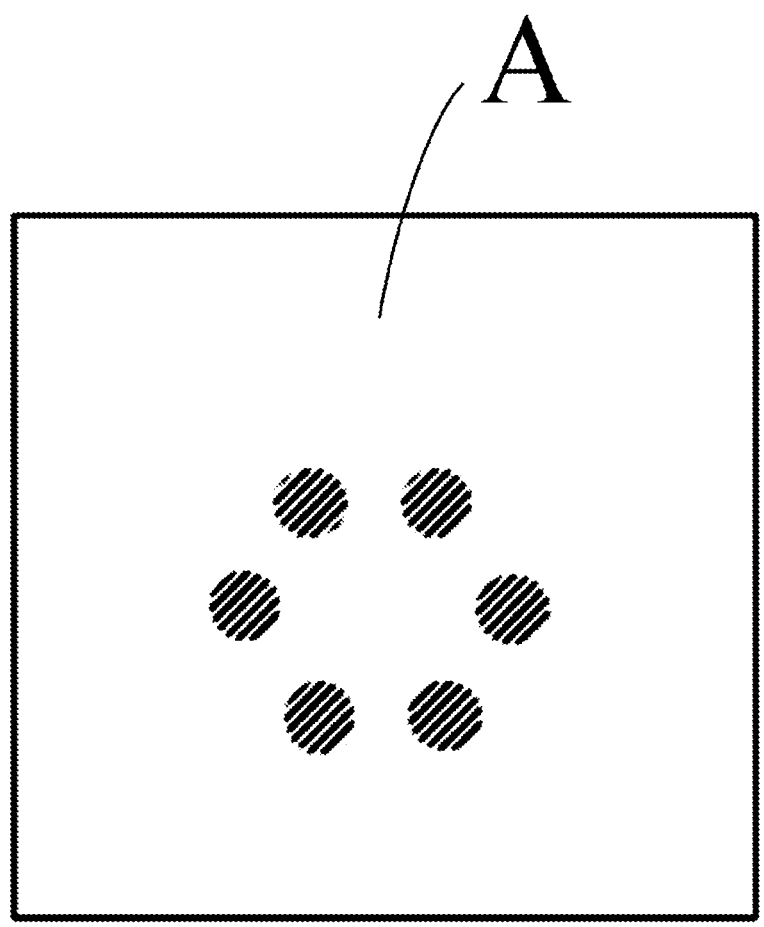
Figure 7E:
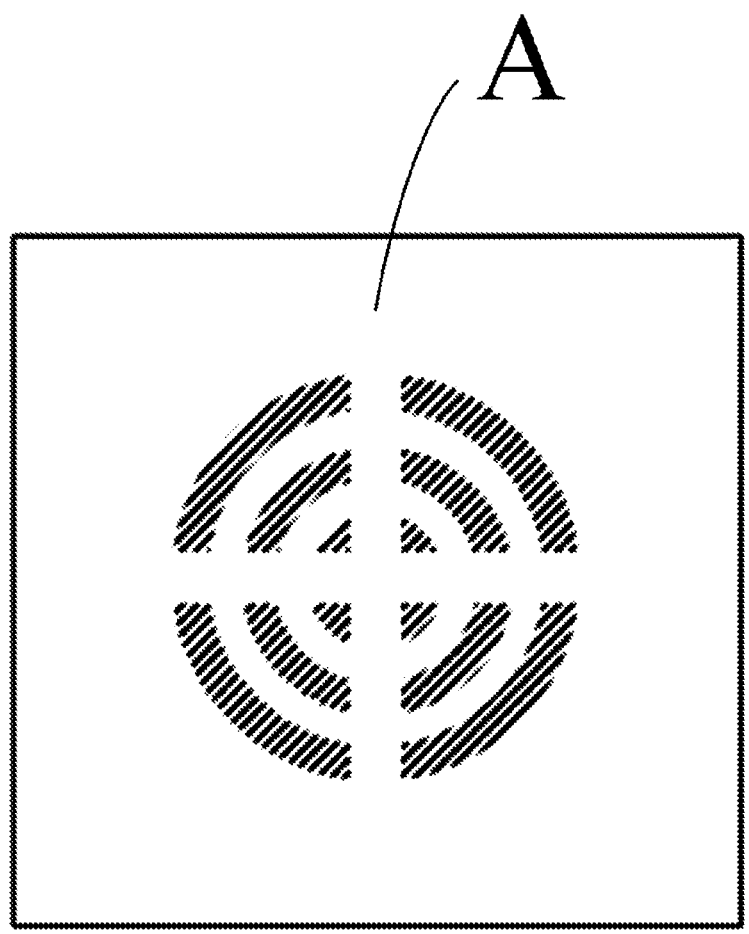
Figure 7F:
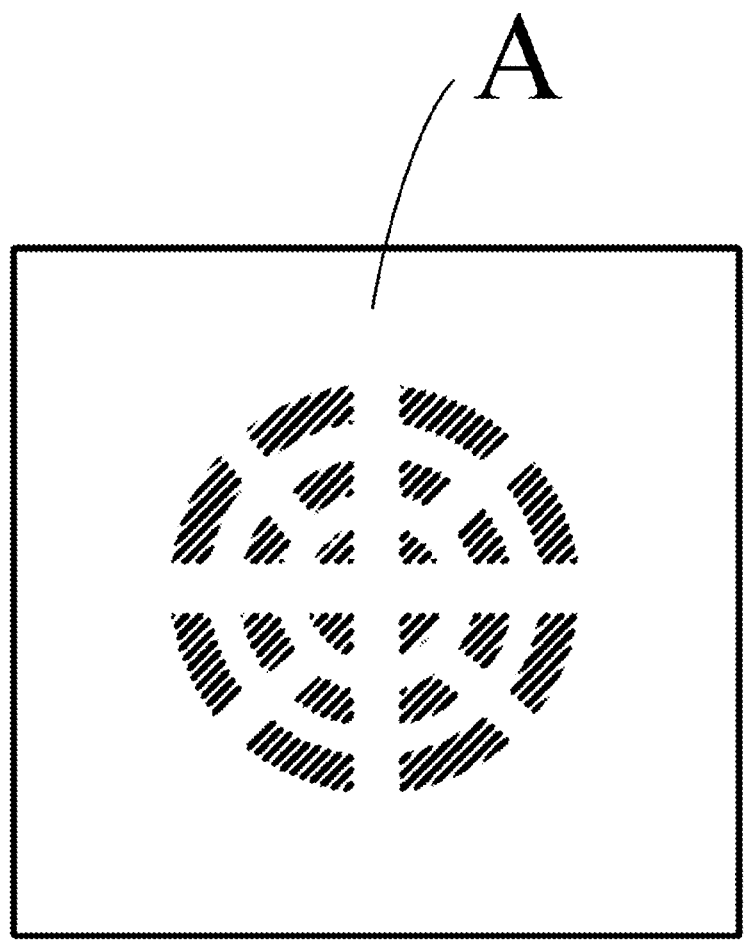

Alternatively, the raised layer 3″ only includes at least one second annular raised portion E arranged around the center of the vibration element A, and an orthographic projection of the second annular raised portion E on the base substrate is closed or non-closed, such as structures shown in FIGS. 7D-7F, which is certainly not limited thereto.

During specific implementation, in the above vibration panel provided in the embodiment of the present disclosure, as shown in FIGS. 7B-7F, the non-closed second annular raised portion E includes an even number of second raised sub-portions E1, and any two second raised sub-portions E1 at opposite positions are symmetrically arranged with the center of the vibration element A as a center of symmetry.

Specifically, the raised layer 3″ shown in FIGS. 7A-7F is fixed in the innermost region of the hollow pattern 11 corresponding to the vibration element A in FIG. 1.

Figure 8:
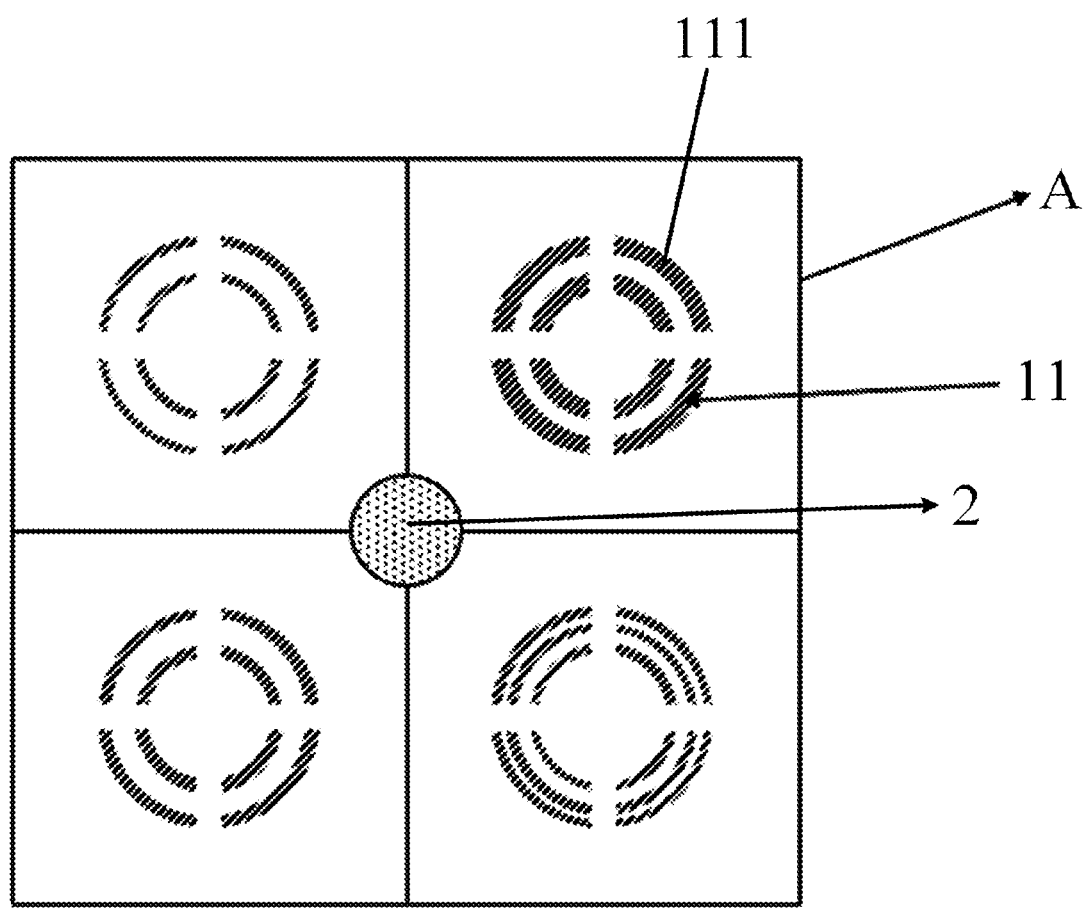
FIG. 8 is an enlarged view of a local portion in FIG. 1.

During specific implementation, in the above vibration panel provided in the embodiment of the present disclosure, as shown in FIG. 8, FIG. 8 illustrates an enlarged view of a local portion in FIG. 1, a shape of the annular hollow pattern 11 includes a centrosymmetric figure, and a center of symmetry of the centrosymmetric figure coincides with the center of the vibration element A such that uniformity of vibration at all positions of the vibration element A may be ensured.

During specific implementation, in the above vibration panel provided in the embodiment of the present disclosure, as shown in FIG. 8, the annular hollow pattern 11 includes a plurality of sub-portions 111, and the plurality of sub-portions 111 are uniformly arranged around the center of the vibration element A at intervals.

Each sub-portion 111 is in a shape of any one of the following shapes including but not limited to an arc and a polygonal box, etc. In the embodiments of the present disclosure, for example, the sub-portion 111 is in the shape of an arc.

During specific implementation, in the above vibration panel provided in the embodiment of the present disclosure, as shown in FIG. 8, an even number of sub-portions 111 are arranged, and two sub-portions 111 arranged in opposite positions are symmetrically arranged with the center of the vibration element A as the center of symmetry, so as to ensure the uniformity of vibration at all positions of the vibration element A and improve the user experience.

During specific implementation, in the above vibration panel provided in the embodiment of the present disclosure, as shown in FIG. 8, for each vibration element A corresponding to the annular hollow pattern 11 having a different total area, the annular hollow pattern 11 in each vibration element A is identical in number and different in size. For example, in FIG. 8, an equal number of the annular hollow pattern 11 correspond to each of the three vibration elements A at an upper left corner, an upper right corner and a lower left corner, but the annular hollow pattern 11 in each of the three vibration elements A has a different size, such that the annular hollow pattern 11 in each of the three vibration elements A at the upper left corner, the upper right corner and the lower left corner has the different total area.

Alternatively, for each vibration element A corresponding to the annular hollow pattern 11 having a different total area, the annular hollow pattern 11 in each vibration element A is different in number and identical in size. For example, a different number of annular hollow pattern 11 correspond to each of the two vibration elements A at an upper left corner and a lower right corner in FIG. 8, but the annular hollow pattern 11 in each of the two vibration elements A has the same size, such that the annular hollow pattern 11 in each of the two vibration elements A at the upper left corner and the lower right corner have the different total area.

It should be noted that the size of the annular hollow pattern 11 refers to, for example, a pipe diameter in the case that the annular hollow pattern 11 is in a shape of an arc.

During specific implementation, in the above vibration panel provided in the embodiment of the present disclosure, as shown in FIG. 1, each driver 2 drives four vibration elements A to independently vibrate, the hollow pattern 11 corresponding to each of the four vibration elements A has a different total area, and the driver 2 is arranged in the middle of the four vibration elements A. Certainly, during specific implementation, one driver 2 may also drive one vibration element A to vibrate.

During specific implementation, in the above vibration panel provided in the embodiment of the present disclosure, as shown in FIGS. 2, 4, 5 and 9, the driver 2 may be a piezoelectric device 2, and the piezoelectric device 2 includes a first electrode 21, a piezoelectric layer 22 and a second electrode 23 that are stacked on the base substrate 1.

Figure 9:
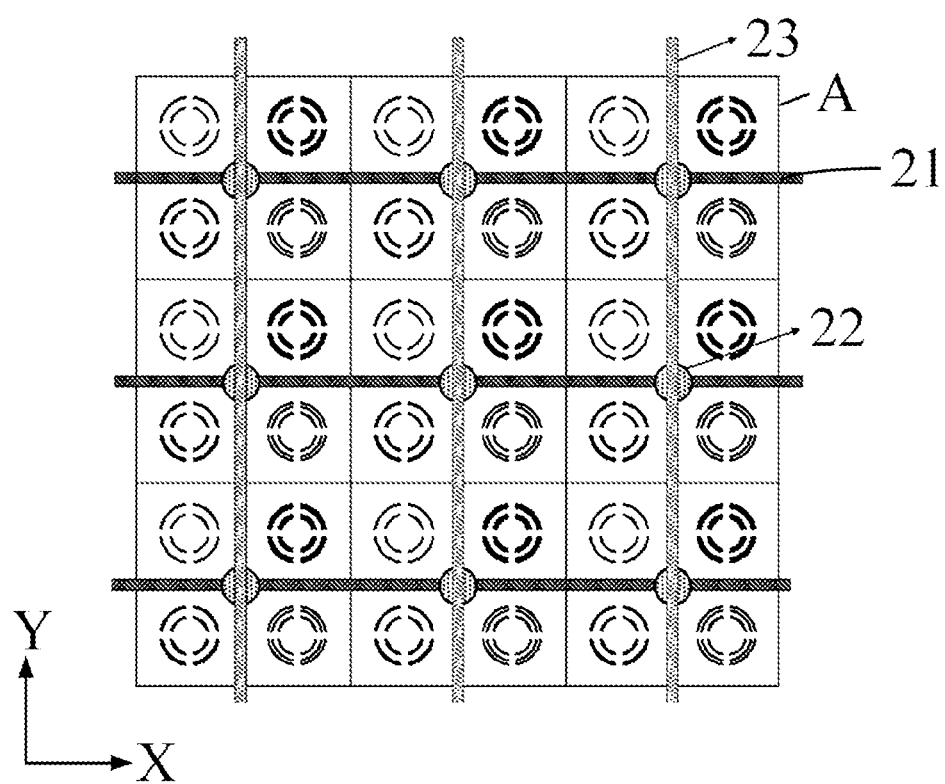
FIG. 9 is a schematic diagram of a circuit for driving a vibration panel provided in an embodiment of the present disclosure.

As shown in FIG. 9, first electrodes 21 corresponding to piezoelectric devices 2 in the same row are the same electrode, and the first electrodes 21 extend in a first direction X. Second electrodes 23 corresponding to the piezoelectric devices 2 in the same column are the same electrode, and the second electrodes 23 extend in a second direction Y The first direction X and the second direction Y intersect with each other.

Specifically, as shown in FIG. 9, for a plurality of vibration elements A, arrayed electrode wiring is designed, such that local vibration regions may be controlled by means of frequencies, and amplitudes may be adjusted and controlled by adjusting voltage signals, thereby improving the sense of touch. Specifically, by adjusting a frequency of an alternating voltage for driving the piezoelectric device 2, the vibration element A may independently vibrate. By adjusting the alternating voltage for driving the piezoelectric device 2, a vibration amplitude of the piezoelectric device 2 corresponding to a target region (for example, the vibration element A at any position) may be adjusted and controlled. For example, by applying alternating voltages to the first electrode 21 and the second electrode 23, the piezoelectric layers 22 in overlapping regions of the first electrode 21 and the second electrode 23 vibrate, so as to drive the vibration element in a target position (for example, the vibration element A at any position) to vibrate. Therefore, according to the embodiment of the present disclosure, local vibration positions and amplitudes may be adjusted and controlled by means of frequencies and driving signals, such that more delicate tactile experience is realized.

During specific implementation, in the above vibration panel provided in the embodiment of the present disclosure, as shown in FIGS. 2, 4, 5 and 10, the driver 2 may be a piezoelectric device 2, and the piezoelectric device 2 includes a first electrode 21, a piezoelectric layer 22 and a second electrode 23 that are stacked on the base substrate 1.

Figure 10:
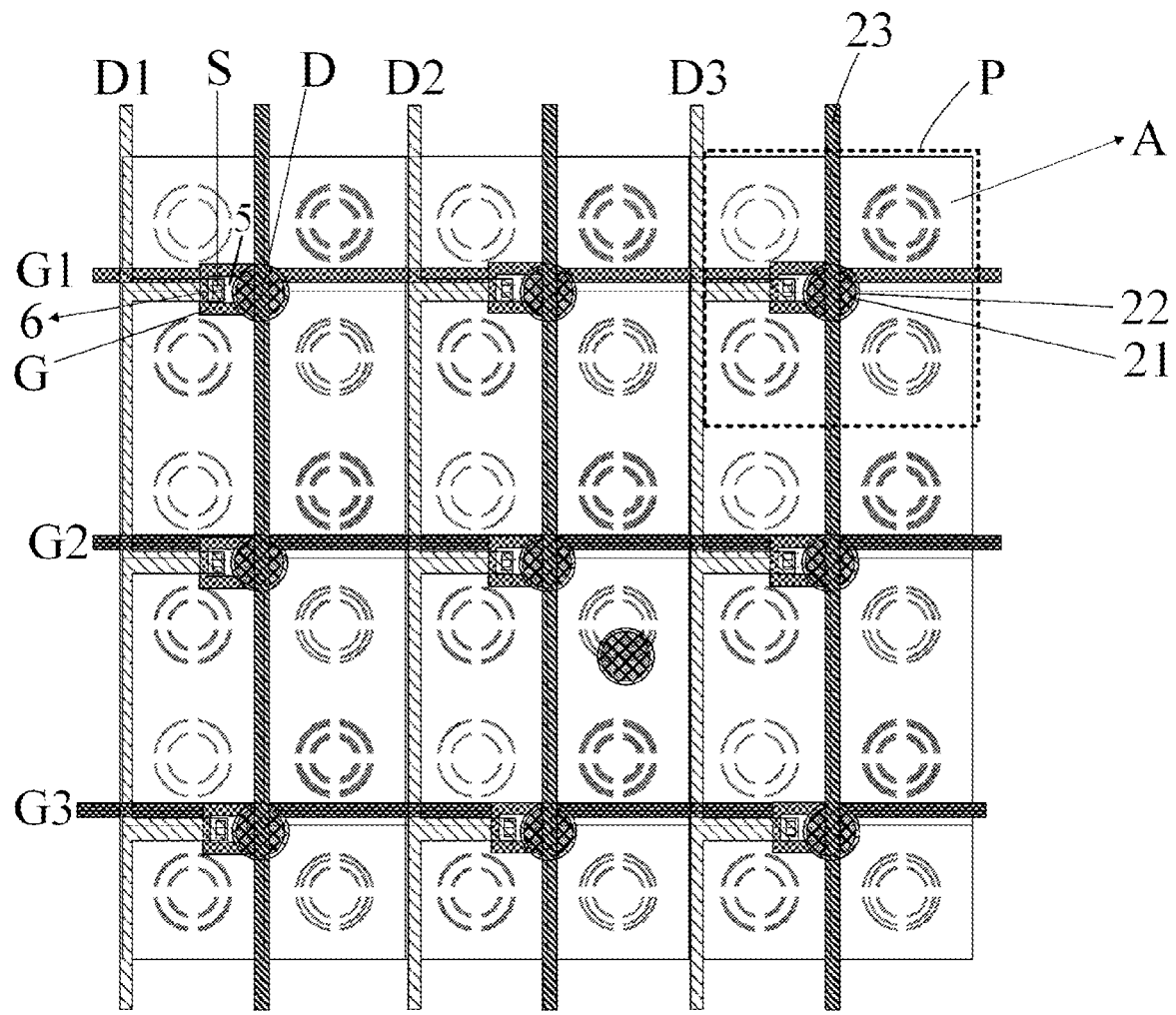
FIG. 10 is a schematic diagram of another circuit for driving a vibration panel provided in an embodiment of the present disclosure.

As shown in FIG. 10, the vibration panel further includes a plurality of scanning lines (G1, G2, G3, . . . ) and a plurality of voltage input lines (D1, D2, D3, . . . ) that intersect with each other, the plurality of scanning lines (G1, G2, G3, . . . ) and the plurality of voltage input lines (D1, D2, D3, . . . ) define a plurality of vibration regions P, and each vibration region P includes four vibration elements A.

Figure 11:
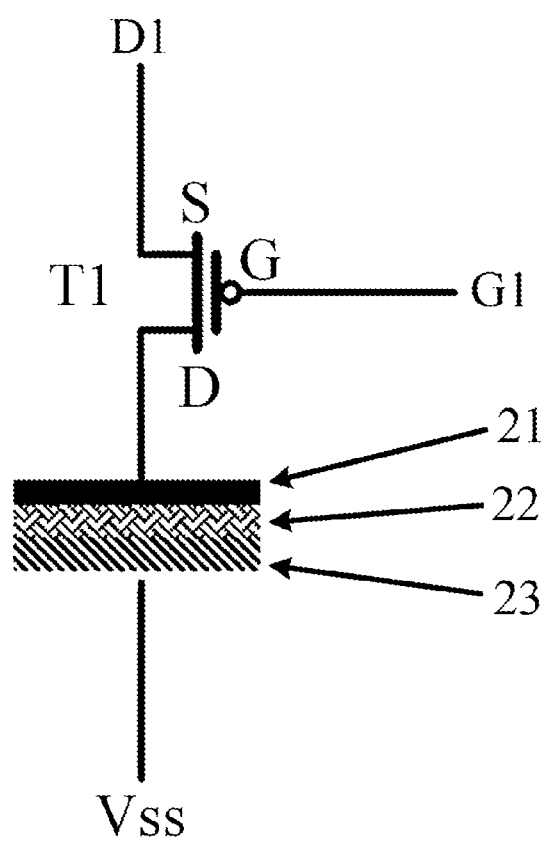
FIG. 11 is a schematic diagram of an equivalent circuit corresponding to one vibration region in FIG. 10.
Figure 12:
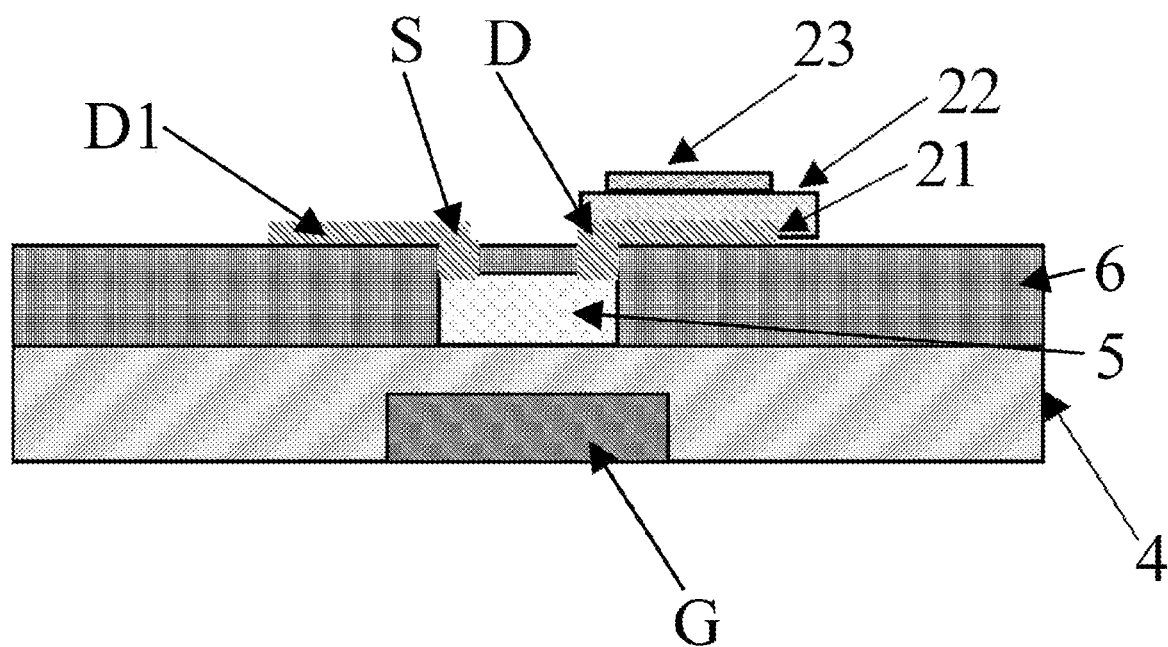
FIG. 12 is a sectional view of a film layer of a switching transistor and a piezoelectric device corresponding to a vibration region in FIG. 10.

Each vibration region P includes a switching transistor T1, as shown in FIGS. 10-12, where FIG. 11 illustrates a schematic diagram of an equivalent circuit of a switching transistor T1 and a piezoelectric device 2 in one vibration region P in FIG. 10, and FIG. 12 illustrates a sectional view of a film layer of a switching transistor T1 and a piezoelectric device 2 in one vibration region P in FIG. 10. Each switching transistor T1 includes: a gate electrode G, a first insulating layer 4, an active layer 5, a second insulating layer 6, a source electrode S and a drain electrode D that are stacked. The source electrode S and the drain electrode D are electrically connected to the active layer 5 separately by means of via holes penetrating the second insulating layer 6. The first electrodes 21 are electrically connected to the drain electrodes D of the corresponding switching transistors T1, the piezoelectric devices 2 in the same column share the same second electrode 23, the gate electrodes of the switching transistors T1 corresponding to the piezoelectric devices 2 in the same row are electrically connected to the same scanning line (for example, the gate electrodes of the switching transistors T1 corresponding to the piezoelectric devices 2 in the first row are electrically connected to the first scanning line G1, the gate electrodes of the switching transistors T1 corresponding to the piezoelectric devices 2 in the second row are electrically connected to the second scanning line G2, the gate electrodes of the switching transistors T1 corresponding to the piezoelectric devices 2 in the third row are electrically connected to the third scanning line G3, etc.), the first electrodes of the switching transistors T1 corresponding to the piezoelectric devices 2 in the same column are electrically connected to the same voltage input line (for example, the gate electrodes of the switching transistors T1 corresponding to the piezoelectric devices 2 in the first row are electrically connected to the first voltage input line D1, the gate electrodes of the switching transistors T1 corresponding to the piezoelectric devices 2 in the second row are electrically connected to the second voltage input line D2, the gate electrodes of the switching transistors T1 corresponding to the piezoelectric devices 2 in the third row are electrically connected to the third voltage input line D3, etc.), the second electrodes of the switching transistors T1 are electrically connected to the first electrodes 21 of the corresponding piezoelectric devices 2, and the second electrodes of the piezoelectric devices 2 are electrically connected to a fixed potential terminal VSS.

Figure 13:
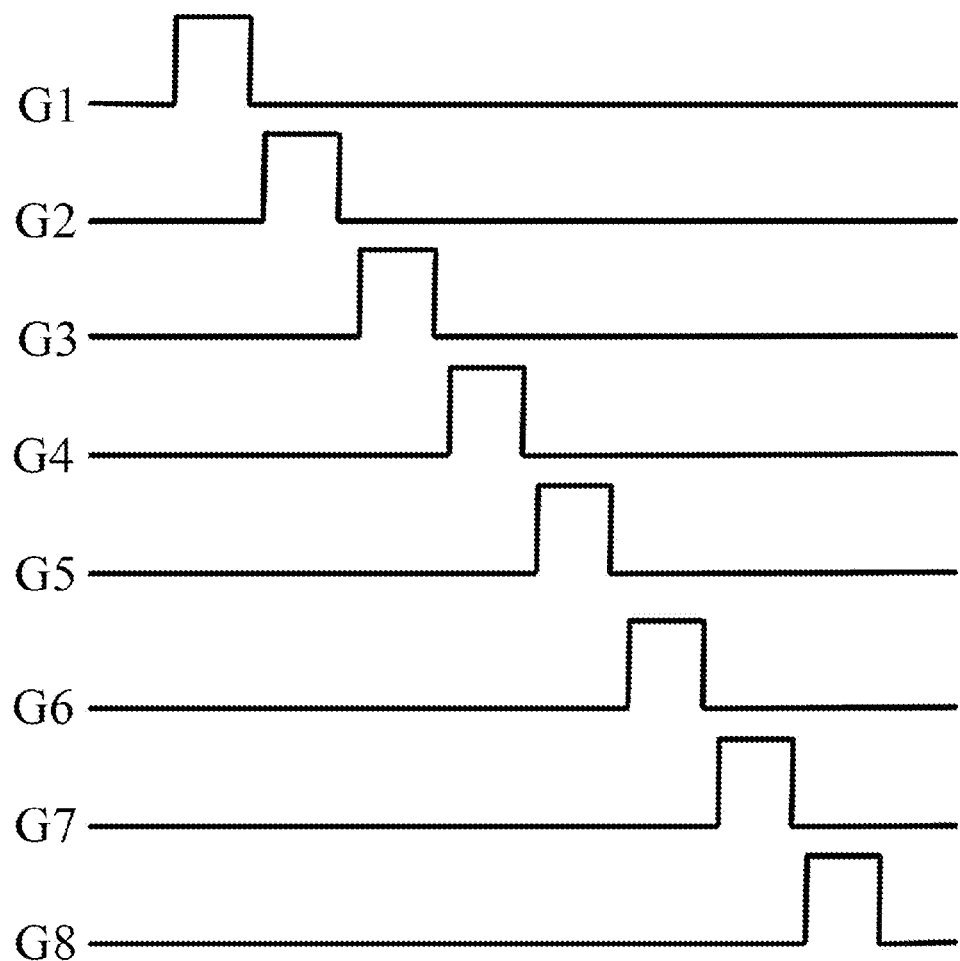
FIG. 13 is a scanning sequence diagram corresponding to FIG. 10.

Specifically, as shown in FIGS. 10-12, the piezoelectric devices 2 are actively driven by introducing the switching transistors T1. Scanning signals may be applied to scanning lines (G1, G2, G3, etc.) by means of row-by-row scanning. As shown in FIG. 13, FIG. 13 shows a scanning sequence, and row-by-row control over local vibration elements may be realized. By applying alternating voltages to voltage input lines (D1, D2, D3, etc.) corresponding to the piezoelectric devices 2 at target positions, the piezoelectric devices 2 at the target positions vibrate to drive the vibration elements A at the target positions to vibrate, so as to drive the selected vibration elements A, thereby achieving a shape of a vibration pattern. As shown in FIG. 14, in FIG. 14, black squares represent the vibration elements that are vibrating, and white squares represent the vibration elements that are not vibrating. Moreover, by adjusting the voltages input to the first electrodes 21, the amplitudes of vibration elements that are vibrating may be adjusted.

Therefore, according to the embodiment of the present disclosure, local vibration positions and amplitudes may be adjusted and controlled by means of frequencies and driving signals, such that more delicate tactile experience is realized.

Specifically, as shown in FIG. 10, all the scanning lines (G1, G2, G3, etc.) may be electrically connected to a scanning driving circuit, and all the voltage input lines (D1, D2, D3, etc.) may be electrically connected to a data driving circuit.

It should be noted that FIGS. 9 and 10 illustrates a method for driving a piezoelectric device, and the counterweight layers and/or the raised layers are not illustrated in the vibration elements A in FIGS. 9 and 10.

Figure 15:
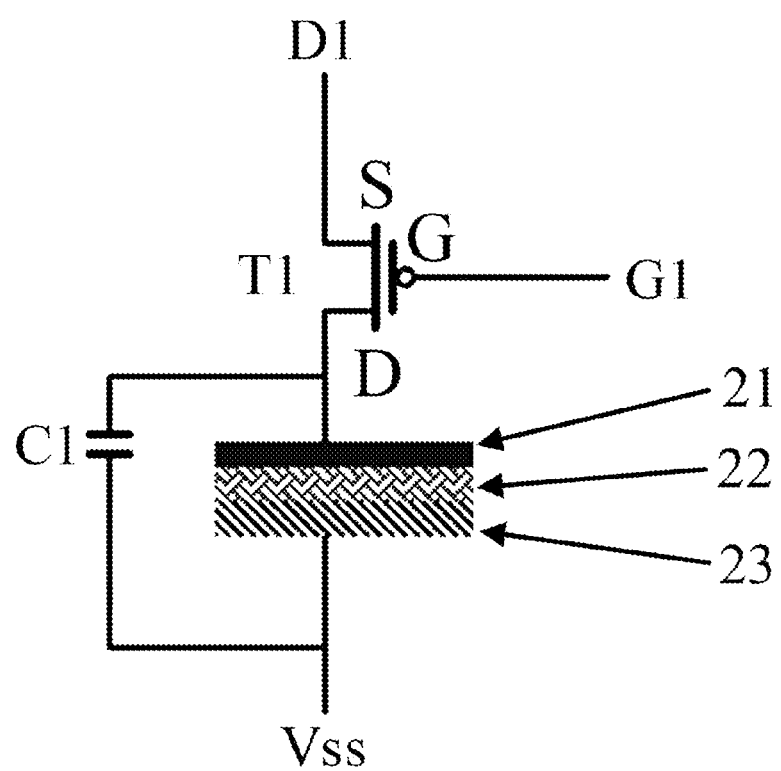
FIG. 15 is a schematic diagram of another equivalent circuit corresponding to a vibration region in FIG. 10.

During specific implementation, when row-by-row scanning is carried out by means of the structure shown in FIG. 10, in order to ensure that a vibration pattern during previous-row scanning is retained before next-row scanning, in the above vibration panel provided in the embodiment of the present disclosure, as shown in FIG. 15, each vibration region P further includes a capacitor C1. A first terminal of the capacitor C1 is connected between a second electrode of a switching transistor T1 and a first electrode 21 of a piezoelectric device 2, and a second terminal of the capacitor C1 is connected between a second electrode 23 of the piezoelectric device 2 and a fixed potential terminal VSS. Specifically, the capacitors C1 may maintain a voltage between the first electrode 21 and the second electrode 23 of the piezoelectric device 2 until next-row scanning is started.

To sum up, according to the vibration panel provided in the embodiment of the present disclosure, a sense of touch of local vibration may be improved, local vibration positions and amplitudes may be adjusted and controlled by means of frequencies and driving signals, such that more delicate tactile experience is realized.

It should be noted that in the embodiment of the present disclosure, the driver being a piezoelectric device is taken as an example for illustration. Certainly, during specific implementation, the driver may also be a linear motor, which is not limited herein.

During specific implementation, the piezoelectric layer may be made of at least one of the following materials: lead zirconate titanate (Pb(Zr,Ti)O$_3$, PZT), aluminum nitride (AlN), zinc oxide (ZnO), barium titanate (BaTiO$_3$), lead titanate (PbTiO$_3$), potassium niobate (KNbO$_3$), lithium niobate (LiNbO$_3$), lithium tantalate (LiTaO$_3$) and lanthanum gallium silicate (La$_3$Ga$_5$SiO$_{14}$). Specifically, the materials for making the piezoelectric layer may be selected according to actual use requirements of those skilled in the art, and are not limited herein. In the case that the piezoelectric layer is made of the PZT, due to a high piezoelectric coefficient of the PZT, piezoelectric property of the corresponding vibration panel is ensured, and the corresponding vibration panel may be applied to a haptics device. Moreover, since the PZT has a higher light transmittance, when the PZT is integrated into the display device, display quality of a display device is not affected.

During specific implementation, the electrode may be made of one of the following materials of indium tin oxide (ITO), indium zinc oxide (IZO), titanium-aurum (Ti—Au) alloy, titanium-aluminum-titanium (Ti—Al—Ti) alloy, titanium-molybdenum (Ti—Mo) alloy, titanium (Ti), aurum (Au), silver (Ag), molybdenum (Mo), copper (Cu), tungsten (W) and chromium (Cr). Those skilled in the art may set the above electrode according to actual application requirements, which is not limited herein.

Certainly, in addition to the above various film layers of the vibration panel, other film layers may be set according to actual applications.

The vibration panel provided in the embodiment of the present disclosure may be applied to the fields of medical treatment, automotive electronics, motion tracking systems, etc. The vibration panel is particularly suitable for the field of wearable devices, used for medical monitoring and treatment in vitro or implanted into human bodies, or applied to the field of artificial intelligent electronic skin, etc. Specifically, the vibration panel may be applied to vibration panels capable of generating vibration and mechanical properties, such as a brake pad, a keyboard, a mobile terminal, a game pad, a vehicle-mounted device, etc.

On the basis of the same inventive concept, an embodiment of the present disclosure further provides a method for manufacturing a vibration panel. As shown in FIG. 16, the method includes S1601 and S1602.

S1601, providing a base substrate. The base substrate includes at least one vibration element, at least one annular hollow pattern is provided at a portion, corresponding to each vibration element, of the base substrate, an orthographic projection of an annular hollow pattern corresponding to each vibration element on the base substrate is non-closed, and the annular hollow pattern corresponding to each vibration element have a different total area.

S1602, manufacturing at least one driver on one side of the base substrate. The driver is configured to drive at least one vibration element to independently vibrate.

According to the above method for manufacturing a vibration panel provided in the embodiment of the present disclosure, by etching the non-closed annular hollow pattern having a different total area in each vibration element of the base substrate, since the annular hollow pattern of each vibration element has the different total area, a frequency of a signal required to be applied to each annular hollow pattern for vibration is also different. Therefore, by applying different frequency signals to different vibration elements, each vibration element may independently vibrate, thereby controlling the base substrate to generate local vibration. Compared with overall vibration of a base substrate in the prior art, the local vibration realized in the present disclosure may reduce power consumption and resolve a heating problem of the vibration panel caused by vibration, thereby improving performance of the device.

During specific implementation, the above method provided in the embodiment of the present disclosure further includes: manufacture a reinforcement structure on one side of the base substrate, where the reinforcement structure is arranged at an innermost region of the annular hollow pattern. By arranging the reinforcement structure in the innermost region of the annular hollow pattern, a sense of touch of local vibration may be enhanced, and user experience may be improved.

During specific implementation, in the above method provided in the embodiment of the present disclosure, the reinforcement structure includes a counterweight layer, where the counterweight layer is manufactured on one side of the base substrate by means of evaporation or adhesion, the counterweight layer and the driver are arranged on the same side of the base substrate, and the counterweight layer is arranged in an innermost region in the annular hollow pattern.

During specific implementation, in the above method provided in the embodiment of the present disclosure, the reinforcement structure includes a raised layer, the raised layer is manufactured on one side of the base substrate by means of coating or attachment, the raised layer and the driver are arranged on opposite sides of the base substrate, and the raised layer is arranged in an innermost region in the annular hollow pattern.

It should be noted that the reinforcement structure may include only the counterweight layer, only the raised layer, or both the counterweight layer and the raised layer.

Specifically, the above manufacturing method provided in the embodiment of the present disclosure may be described with reference to the structures shown in FIGS. 2, 4 and 5.

Figure 17:
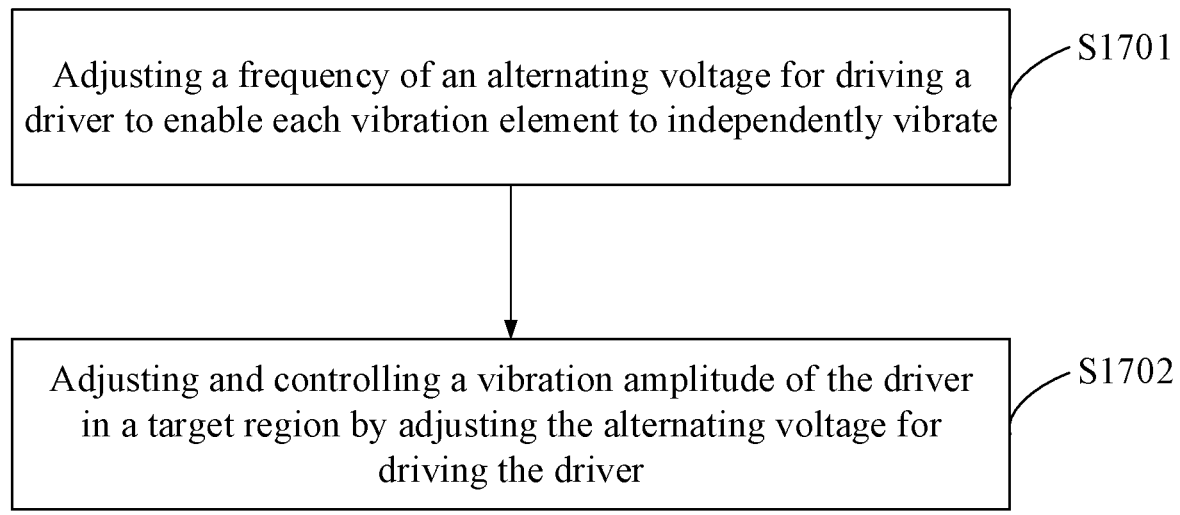
FIG. 17 is a flowchart of a method for driving a vibration panel provided in an embodiment of the present disclosure.

On the basis of the same inventive concept, the embodiment of the present disclosure further provides a method for driving a vibration panel. As shown in FIG. 17, the driving method includes S1701 and S1702.

S1701, adjusting a frequency of an alternating voltage for driving a driver to enable each vibration element to independently vibrate.

S1702, adjusting the alternating voltage for driving the driver and controlling a vibration amplitude of the driver in a target region.

Therefore, according to the driving method for a vibration panel provided in the embodiment of the present disclosure, local vibration positions and amplitudes may be adjusted and controlled by means of frequencies and driving signals, such that more delicate tactile experience is realized.

During specific implementation, in the above driving method provided in the embodiment of the present disclosure, by applying alternating voltages to a first electrode and a second electrode, piezoelectric layers in overlapping regions of the first electrode and the second electrode vibrate, so as to drive a vibration element at a target position to vibrate.

During specific implementation, in the above driving method provided in the embodiment of the present disclosure, by row-by-row applying scanning signals to scanning lines, and inputting an alternating voltage to a voltage input line corresponding to a piezoelectric device at a target position, the piezoelectric layer at the target position vibrates, so as to drive the vibration element at the target position to vibrate.

Specifically, for the above driving method provided in the embodiment of the present disclosure, reference may be made to the description of the related driving method in FIGS. 9 and 10 of the embodiment of the vibration panel, which will not be repeated herein.

On the basis of the same inventive concept, an embodiment of the present disclosure further provides a vibration apparatus. The vibration apparatus includes the above vibration panel provided in the embodiment of the present disclosure. Since the principle of solving problems of the vibration apparatus is similar to that of the above vibration panel, for implementation of the vibration apparatus, reference may be made to implementation of the above vibration panel, and the repeated contents will not be described again. The vibration apparatus may be a mobile phone, a tablet computer, a television, a monitor, a notebook computer, a digital photo frame, a navigator or other products or components having a display or touch control function.

During specific implementation, the above vibration apparatus provided in the embodiment of the present disclosure may further include other film layers well known to those skilled in the art, which will not be described in detail herein.

During specific implementation, a touch control position of a human body may be determined by means of the vibration apparatus, such that corresponding vibration waveforms, amplitudes and frequencies are generated, and human-computer interaction may be realized.

Certainly, the vibration apparatus may further be applied to the fields of medical treatment, automobile electronics, motion tracking systems etc. according to actual requirements, which will not be described in detail herein.

The embodiments of the present disclosure provide the vibration panel, the manufacturing method and driving method therefor and the vibration apparatus. By etching the non-closed annular hollow pattern having the different total area in each vibration element of the base substrate, and applying different frequency signals, local vibration of the base substrate may be controlled. By arranging the reinforcement structure in the innermost region of the annular hollow pattern, the sense of touch of local vibration may be enhanced, and the user experience is improved.

Although the preferential embodiments of the present disclosure have been described, those skilled in the art may make additional changes and modifications to these embodiments once they learn the basic inventive concept. Therefore, the appended claims are intended to be interpreted as including the preferential embodiments and all changes and modifications falling within the scope of the present disclosure.

Apparently, those skilled in the art can make various modifications and variations to the embodiments of the present disclosure without departing from the spirit and scope of the present disclosure. In this way, if these modifications and variations of the embodiments of the present disclosure fall within the scope of the claims of the present disclosure and equivalent technologies thereof, the present disclosure is further intended to include these modifications and variations.

What is claimed is:

1. A vibration panel, comprising:
a base substrate, comprising at least one vibration element, wherein at least one annular hollow pattern is provided at a portion, corresponding to each of the at least one vibration element, of the base substrate, an orthographic projection of an annular hollow pattern corresponding to the each vibration element on the base substrate is non-closed, and the annular hollow pattern corresponding to the each vibration element has a different total area; and
at least one driver, arranged on one side of the base substrate, wherein the at least one driver is configured to drive the at least one vibration element to independently vibrate.

2. The vibration panel according to claim 1, further comprising a reinforcement structure arranged on one side of the base substrate, wherein the reinforcement structure is arranged in an innermost region of the annular hollow pattern.

3. The vibration panel according to claim 2, wherein the reinforcement structure comprises a counterweight layer, wherein the counterweight layer and the at least one driver are arranged on a same side of the base substrate.

4. The vibration panel according to claim 3, wherein the counterweight layer is made of at least one of the following materials: molybdenum (Mo), cuprum (Cu) and aluminum (Al):
wherein a shape of the counterweight layer is an axisymmetric figure or a centrosymmetric figure, and a center of the counterweight layer coincides with a center of a corresponding vibration element.

5. The vibration panel according to claim 4, wherein the shape of the counterweight layer comprises at least one of:
a square;
a circle;
an annulus;
a polygon; and
an annular structure, wherein the annular structure comprises a plurality of sub-structures arranged at intervals, and the plurality of sub-structures are uniformly arranged around a center of a corresponding vibration element at intervals.

6. The vibration panel according to claim 2, wherein the reinforcement structure comprises a raised layer, wherein the raised layer and the at least one driver are arranged on opposite sides of the base substrate.

7. The vibration panel according to claim 6, wherein the raised layer is made of at least one of the following materials: polydimethylsiloxane, polyethylene terephthalate and polycarbonate:
wherein the raised layer is in a shape of an axisymmetric figure or a centrosymmetric figure, and a center of the raised layer coincides with a center of a corresponding vibration element.

8. The vibration panel according to claim 7, wherein the raised layer is of an integrated structure; or,
the raised layer comprises a first raised portion arranged in the center of the corresponding vibration element and at least one second annular raised portion arranged around the first raised portion, and an orthographic projection of the second annular raised portion on the base substrate is closed or non-closed; or,
the raised layer comprises at least one second annular raised portion arranged around the center of the corresponding vibration element, and an orthographic projection of the second annular raised portion on the base substrate is closed or non-closed.

9. The vibration panel according to claim 8, wherein the non-closed second annular raised portion comprises an even number of second raised sub-portions, and any two second raised sub-portions at opposite positions are symmetrically arranged with the center of the corresponding vibration element as a center of symmetry.

10. The vibration panel according to claim 1, wherein a shape of the annular hollow pattern comprises a centrosymmetric figure, and a center of symmetry of the centrosymmetric figure coincides with the center of a corresponding vibration element.

11. The vibration panel according to claim 1, wherein the annular hollow pattern comprises a plurality of sub-portions, and the plurality of sub-portions are uniformly arranged around a center of a corresponding vibration element at intervals, and
each of the plurality of sub-portions is in a shape of any one of: an arc and a polygonal box.

12. The vibration panel according to claim 11, wherein an even number of sub-portions are arranged, and two sub-portions at opposite positions are symmetrically arranged with the center of the corresponding vibration element as a center of symmetry.

13. The vibration panel according to claim 1, wherein for the each vibration element corresponding to the annular hollow pattern having a different total area, the annular hollow pattern in the each vibration element is identical in number and different in size; or,
for the each vibration element corresponding to the annular hollow pattern having a different total area, the annular hollow pattern in the each vibration element is different in number and identical in size.

14. The vibration panel according to claim 1, wherein each of the at least one driver drives four vibration elements to independently vibrate, the hollow pattern corresponding to each of the four vibration elements has a different total area, and the each driver is arranged in a middle of the four vibration elements.

15. The vibration panel according to claim 14, wherein the each driver is a piezoelectric device, and the piezoelectric device comprises a first electrode, a piezoelectric layer and a second electrode that are stacked on the base substrate;
first electrodes corresponding to piezoelectric devices in a same row are a same electrode, and the first electrodes extend in a first direction; second electrodes corresponding to piezoelectric devices in a same column are a same electrode, and the second electrodes extend in a second direction; and the first direction and the second direction intersect with each other.

16. The vibration panel according to claim 14, wherein the each driver is a piezoelectric device, and the piezoelectric device comprises a first electrode, a piezoelectric layer and a second electrode that are stacked on the base substrate;
the vibration panel further comprises a plurality of scanning lines and a plurality of voltage input lines that intersect with each other, the plurality of scanning lines and the plurality of voltage input lines define a plurality of vibration regions, and each of the plurality of vibration regions comprises four vibration elements; and
the each vibration region comprises a switching transistor, gate electrodes of switching transistors corresponding to piezoelectric devices in a same row are electrically connected to a same scanning line, first electrodes of the switching transistors corresponding to the piezoelectric devices in a same column are electrically connected to a same voltage input line, second electrodes of the switching transistors are electrically connected to first electrodes of the corresponding piezoelectric devices, and second electrodes of the piezoelectric devices are electrically connected to fixed potential terminals.

17. The vibration panel according to claim 16, wherein the each vibration region further comprises a capacitor, a first terminal of the capacitor is connected between a second electrode of a corresponding switching transistor and a first electrode of a corresponding piezoelectric device, and a second terminal of the capacitor is connected between a second electrodes of the corresponding piezoelectric device and a fixed potential terminal.

18. A method for driving the vibration panel of claim 1, comprising:
adjusting a frequency of an alternating voltage for driving a driver to enable the each vibration element to independently vibrate; and
adjusting and controlling a vibration amplitude of the driver in a target region by adjusting the alternating voltage for driving the driver.

19. A vibration apparatus, comprising a vibration panel, wherein the vibration panel comprises:
a base substrate, comprising at least one vibration element, wherein at least one annular hollow pattern is provided at a portion, corresponding to each of the at least one vibration element, of the base substrate, an orthographic projection of an annular hollow pattern corresponding to the each vibration element on the base substrate is non-closed, and the annular hollow pattern corresponding to the each vibration element has a different total area; and
at least one driver, arranged on one side of the base substrate, wherein the at least one driver is configured to drive the at least one vibration element to independently vibrate.

20. A method for manufacturing a vibration panel, comprising:
providing a base substrate, wherein the base substrate comprises at least one vibration element, at least one annular hollow pattern is provided at a portion, corresponding to each of the at least one vibration element, of the base substrate, an orthographic projection of an annular hollow pattern corresponding to the each vibration element on the base substrate is non-closed, and the annular hollow pattern corresponding to the each vibration element has a different total area; and
manufacturing at least one driver on one side of the base substrate, wherein the at least one driver is configured to drive the at least one vibration element to independently vibrate.

* * * * *